United States Patent
Davis

(10) Patent No.: US 6,681,908 B2
(45) Date of Patent: Jan. 27, 2004

(54) ADJUSTABLE TUNED MASS DAMPER

(75) Inventor: Toren S. Davis, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/041,723

(22) Filed: Jan. 8, 2002

(65) Prior Publication Data

US 2003/0127295 A1 Jul. 10, 2003

(51) Int. Cl.[7] .................................................. F16F 7/10
(52) U.S. Cl. ........................................ 188/380; 267/177
(58) Field of Search .............................. 188/378, 379, 188/380; 267/177, 175

(56) References Cited

U.S. PATENT DOCUMENTS

| | | | | |
|---|---|---|---|---|
| 2,685,822 A | | 8/1954 | Walton | |
| 2,854,100 A | * | 9/1958 | Bowers et al. | 188/316 |
| 3,259,212 A | * | 7/1966 | Nishioka et al. | 188/378 |
| 3,613,520 A | * | 10/1971 | Worden | 92/133 |
| 4,238,104 A | | 12/1980 | Hamilton | |
| 4,925,198 A | * | 5/1990 | Ito et al. | 280/89 |
| 5,016,409 A | * | 5/1991 | Sato | 52/167.2 |
| 5,511,533 A | * | 4/1996 | Waller | 124/89 |
| 5,564,537 A | * | 10/1996 | Shoureshi | 188/380 |
| 5,816,373 A | | 10/1998 | Osterberg et al. | |

FOREIGN PATENT DOCUMENTS

| | | |
|---|---|---|
| FR | 2330554 A1 | 6/1977 |
| GB | 784387 | 10/1957 |
| JP | 57-25543 * | 2/1982 |
| JP | 02066337 | 3/1990 |
| JP | 9-303483 * | 11/1997 |

* cited by examiner

Primary Examiner—Jack Lavinder
Assistant Examiner—Bradley T King

(57) ABSTRACT

A tuned mass damper is adjusted by turning a screw inside the damper that engages coils on a spring, reducing or increasing spring stiffness without displacing the spring.

10 Claims, 1 Drawing Sheet

ADJUSTABLE TUNED MASS DAMPER

BACKGROUND

A tuned mass damper (TMD) provides improved damping to structures and devices at a single frequency by tuning the damper's natural frequency to be at or close to the single frequency. TMDs are attached to the structure at an effective position, usually the anti-node, to counteract the device's vibration. The vibration stimulates the TMD to oscillator independently, 180 degrees out of phase, reducing the device's vibration.

A TMD typically is adjusted at the factory by changing springs or removing material from the oscillating mass, estimating the frequency of the device to be damped. The typical TMD comprises a mass, a spring and a damping means which form a system with a specific natural resonant frequency and because of that structure it is difficult to tune that frequency.

SUMMARY

A TMD according to invention is adjustable by utilizing an adjustment screw that is retracted or advanced, changing the number of active coils in a spring that engages a damping mass in a sealed TMD. The screw adjustment changes the spring rate and the natural frequency of the spring-mass combination but does not compress the spring.

Objects, benefits and features of the invention will be apparent to one of ordinary skill in the art from the drawing and following description.

BRIEF DESCRIPTION OF THE DRAWING

The drawing is a cross section of a tubular adjustable tuned mass damper that embodies the present invention.

DESCRIPTION

Figure 1:
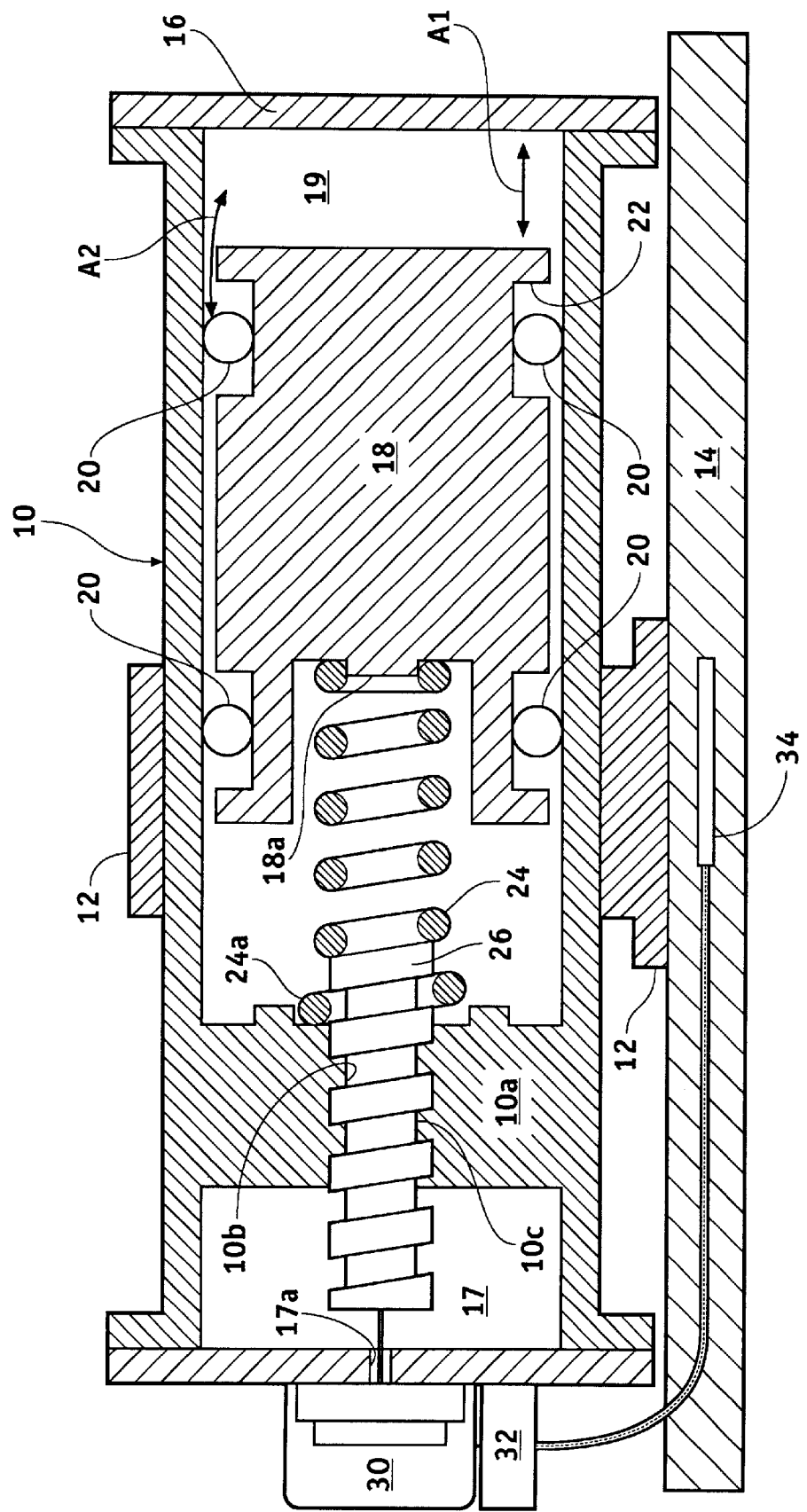

The TMD 10 shown in the drawing comprises a tubular structure attached by a bracket 12 to a device or structure 14 that is subject to oscillations which are damped by the TMD 10. The TMD 10 has two removable end-plates 16, 17 providing access to the interior of the TMD where a cylindrical mass 18 is located in a cylindrical chamber 19 and supported by a plurality of ball bearings 20, constrained within grooves 22 running lengthwise along the mass (arrow A1) to enable sufficient lateral movement for the mass to oscillator back and forth (arrow A1). Gas flow, arrow, across the mass 18 damps those oscillations as it moves in the chamber 19.

A primary coil spring 24 is placed between one end of the mass 18 and internal wall 10a of the chamber 19. A screw 26 is threaded into a threaded passage 10b, entering the center of the spring 24 where it captures one or more of the spring's coils, which should have the same screw pitch as the adjustment screw 26 if no movement of mass 18 is desired during adjustment. Rotating the screw 26 changes the spring stiffness and thereby the natural resonant frequency of the mass 18 and spring 24 combination. Rotating the screw 26 does not, however, displace the spring. It only grabs one or more coils, making them effectively rigid. One end of the TMD is sealed from the atmosphere when the end plate 16 is attached by screws or rivets, not shown. The other end plate 17 is similarly attached for sealing the side with the screw 26, but also contains a small passage 17a, closed by a removable plug (not shown), through which the adjustment screw 26 can be turned. A sealing and locking material can be included between the wall 10a and the screw 26, for example at location 10c, producing a screw friction lock and also sealing the interior of the chamber 19 from the atmosphere through the screw threads.

While the invention envisions in its most basic sense manually turning the adjustment screw 26, it is also feasible to automate the process by attaching a screw actuator 30 such as a low speed motor 30 to the housing 10 with a shaft extending through passage 17a to the adjustment screw 26. With this variation of the invention, the spring can be automatically adjusted on device 14 through a sensing apparatus 34 and 32, such as an accelerometer 34 to fine tune the TMD during operation, further reducing the vibrations of the device 14.

One skilled in the art may make modifications, in whole or in part, to a described embodiment of the invention and its various functions and components without departing from the true scope and spirit of the invention.

What is claimed is:

1. A tunable mass damper comprising:
   a sealed chamber comprising a first wall and a second wall, the first wall comprising a threaded bore, the threads of the bore having a pitch, wherein the sealed chamber isolates a damping fluid within the sealed chamber from an ambient environment outside the sealed chamber;
   a mass that slides in the sealed chamber between the first wall and the second wall, the mass comprising a first end facing the first wall of the chamber;
   a cylindrical coiled spring located between the first wall of the chamber and the first end of the mass, the cylindrical coiled spring attached to the first end of the mass and axially aligned with the bore of the first wall, the cylindrical coiled spring comprising coils, the coils of the cylindrical coiled spring having the same pitch as the threads of the threaded bore in the first wall; and
   a cylindrical screw comprising threads, the threads having the same pitch as the cylindrical coils of the cylindrical coiled spring and the threads of the bore, the cylindrical screw threaded through the threads in the first wall and threaded inside the coils of the cylindrical coiled spring, the threads of the screw adjustably engaging the coils of the cylindrical coiled spring.

2. The tunable mass damper of claim 1, further comprising a locking and sealing material in the threads of the bore in the first wall.

3. The tunable mass damper of claim 1, further comprising an end plate operable to seal the screw from the ambient environment and comprising a bore for receiving a plug and providing access to the screw.

4. A tunable mass damper comprising:
   a sealed chamber comprising a first wall and a second wall, the first wall comprising a threaded bore, the threads of the bore having a pitch, wherein the sealed chamber isolates a damping fluid within the sealed chamber from an ambient environment outside the sealed chamber;
   a mass that slides in the sealed chamber between the first wall and the second wall, the mass comprising a first end facing the first wall of the chamber;
   a cylindrical coiled spring located between the first wall of the chamber and the first end of the mass, the spring attached to the first end of the mass and axially aligned with the bore of the first wall, the spring having coils, the coils of the spring having the same pitch as the threads of the threaded bore in the first wall; and means extendable in the coils of the cylindrical coiled spring for changing the spring rate of the spring.

5. The tunable mass damper of claim 4 wherein said means extendable in the coils of the cylindrical coiled spring comprises a screw that is threaded through the threads in the first wall and threaded into the generally cylindrical interior space of the coils of the spring, wherein the threads of the screw adjustably engage the coils of the spring.

6. The tunable mass damper of claim 1, wherein the damping fluid comprises at least one gas.

7. The tunable mass damper of claim 6, wherein the at least one gas comprises air.

8. The tunable mass damper of claim 1, further comprising a motor operable to drive the screw to tune the tunable mass damper, the motor mounted to the tunable mass damper at least one of externally and internally.

9. The tunable mass damper of claim 8, further comprising a controller connected to the motor, the controller operable to control the motor to tune the mass damper responsive to vibrations to be damped as sensed by a sensor.

10. The tunable mass damper of claim 9, wherein the controller is mounted on the tunable mass damper at least one of externally and internally.

* * * * *